US00RE39435E

(19) United States
(12) Reissued Patent
Berman

(10) Patent Number: US RE39,435 E
(45) Date of Reissued Patent: Dec. 19, 2006

(54) LEARNING SYSTEM WITH LEARNER-CONSTRUCTED RESPONSE BASED METHODOLOGY

(75) Inventor: Dennis Ray Berman, Irving, TX (US)

(73) Assignee: DRB LIT Ltd., Irving, TX (US)

(21) Appl. No.: 10/653,748

(22) Filed: Sep. 2, 2003

Related U.S. Patent Documents

Reissue of:
(64) Patent No.: 6,461,166
Issued: Oct. 8, 2002
Appl. No.: 09/690,223
Filed: Oct. 17, 2000

(51) Int. Cl.
*G09B 7/00* (2006.01)

(52) U.S. Cl. ..... 434/323; 434/322; 434/353
(58) Field of Classification Search ..... 434/323, 434/322, 353, 156, 157
See application file for complete search history.

(56) References Cited

U.S. PATENT DOCUMENTS 3,408,749 A 11/1968 Brudner
3,566,482 A * 3/1971 Morchand
3,606,688 A * 9/1971 Zawels et al.
3,671,668 A * 6/1972 Reiffel
3,715,811 A * 2/1973 Thompson et al. ..... 434/310
4,289,313 A * 9/1981 Delamontagne
4,416,454 A * 11/1983 Delamontagne
4,817,036 A 3/1989 Millett et al.
4,833,610 A 5/1989 Zamora et al.
4,895,518 A * 1/1990 Arnold et al.
4,958,284 A * 9/1990 Bishop et al.
5,002,491 A 3/1991 Abrahamson et al.
5,002,865 A * 3/1991 Kumashiro et al.
5,011,413 A * 4/1991 Ferris et al.
5,033,969 A * 7/1991 Kamimura
5,112,064 A * 5/1992 Weedman
5,168,565 A 12/1992 Morita
5,246,375 A * 9/1993 Goede
5,265,065 A 11/1993 Turtle
5,307,266 A 4/1994 Hayashi et al.
5,314,340 A * 5/1994 Gaddis (Continued)

FOREIGN PATENT DOCUMENTS

WO WO 97/18698 * 5/1997

OTHER PUBLICATIONS

Spaced repetition—Wikipedia, Retrieved from the Internet on Apr. 26, 2005: <URL: http://en.wikipedia.org/wiki/Spaced_repetition>.
FullRecall. Retrieved from the Internet on Apr. 25, 2005: <URL: http://www.fullrecall.com>.
Super Memory. Retrieved from the Internet on Apr. 25, 2005 <URL: http://www.supermemo.com>.
Crowder, Norman A., Arithmetic of Computers, An Introduction to Binary and Octal Mathematics. A Tutor Text, 1958, pp. i–iv and 1–18, Doubleday & Company, Garden City, NY.*

*Primary Examiner*—Chanda L. Harris
(74) *Attorney, Agent, or Firm*—Park, Vaughan & Fleming LLP

(57) ABSTRACT

A methodology in which a learner-constructed response is provided in answer to a question presented by the system, the response being evaluated by comparison with predefined expected responses and, based upon the evaluation, the system determining whether to proceed to another question or to offer remedial feedback. Such a learner-constructed response based evaluation methodology greatly reduces the potential for "guess-work" based correct responses and improves the training process through remedial feedback and advancement upon demonstration of knowledge.

174 Claims, 4 Drawing Sheets

U.S. PATENT DOCUMENTS 5,325,465 A 6/1994 Hung et al.
5,384,703 A 1/1995 Withgott et al.
5,424,947 A 6/1995 Nagao et al.
5,441,415 A * 8/1995 Lee et al. ..... 434/350
5,442,780 A 8/1995 Takanashi et al.
5,463,773 A 10/1995 Sakakibara et al.
5,475,588 A 12/1995 Schabes et al.
5,511,793 A * 4/1996 Watt
5,519,608 A 5/1996 Kupiec
5,528,491 A 6/1996 Kuno et al.
5,540,589 A * 7/1996 Waters
5,597,312 A 1/1997 Bloom et al.
5,632,624 A * 5/1997 Cameron et al.
5,689,716 A 11/1997 Chen
5,694,523 A 12/1997 Wical
5,696,962 A 12/1997 Kupiec
5,708,822 A 1/1998 Wical
5,749,736 A * 5/1998 Griswold et al.
5,768,580 A 6/1998 Wical
5,863,208 A * 1/1999 Ho et al.
5,885,087 A * 3/1999 Thomas
5,987,302 A * 11/1999 Driscoll et al.
5,987,443 A 11/1999 Nichols et al.
6,029,043 A 2/2000 Ho et al.
6,067,538 A 5/2000 Zorba et al.
6,077,085 A * 6/2000 Parry et al.
6,086,382 A * 7/2000 Thomas
6,115,683 A * 9/2000 Burstein et al.
6,120,297 A * 9/2000 Morse, III et al.
6,160,987 A 12/2000 Ho et al.
6,164,974 A 12/2000 Carlile et al.
6,168,440 B1 * 1/2001 Clark et al.
6,173,251 B1 1/2001 Ito et al.
6,181,909 B1 * 1/2001 Burstein et al.
6,199,034 B1 3/2001 Wical
6,208,832 B1 3/2001 Remschel
6,226,611 B1 * 5/2001 Neumeyer et al.
6,254,395 B1 * 7/2001 Breland et al.
6,256,399 B1 * 7/2001 Poor
6,267,601 B1 * 7/2001 Jongsma et al.
6,282,404 B1 * 8/2001 Linton
6,287,123 B1 * 9/2001 O'Brien
6,292,792 B1 * 9/2001 Baffes et al.
6,295,439 B1 * 9/2001 Bejar et al.
6,302,698 B1 * 10/2001 Ziv-El
6,311,040 B1 * 10/2001 Kucinski et al.
6,343,935 B1 * 2/2002 Clements
6,345,270 B1 2/2002 Tanaka
6,356,864 B1 * 3/2002 Foltz et al.
6,411,924 B1 6/2002 de Hita et al.
6,461,166 B1 * 10/2002 Berman
6,470,170 B1 10/2002 Chen et al.
6,493,690 B1 12/2002 Bertrand et al.
6,553,382 B1 4/2003 Hatori
6,554,618 B1 4/2003 Lockwood
6,548,470 B1 6/2003 Veale

* cited by examiner

10

12
COMPUTER
14
PROCESSOR
MEMORY
16
DISPLAY
18
AUDIO
20
MOUSE
KEYBOARD
DISK INPUT
24
22
26

LEARNER EVALUATION AND INFORMATION SEQUENCE CONTROL PROGRAM
34
32
40
SINGLE LOGICAL FILE
PRESENTATION CONTROL
PRESENTATION INFORMATION
28
GUI/WEB BROWSER (LEARNER)
30
38
36
EVALUATION CONTROL
EVALUATION INFORMATION
1. PRIMARY KEYWORD(S) AND PHRASE(S)
2. RELATED KEYWORD(S) AND PHRASE(S)
3. SYNONYM(S)

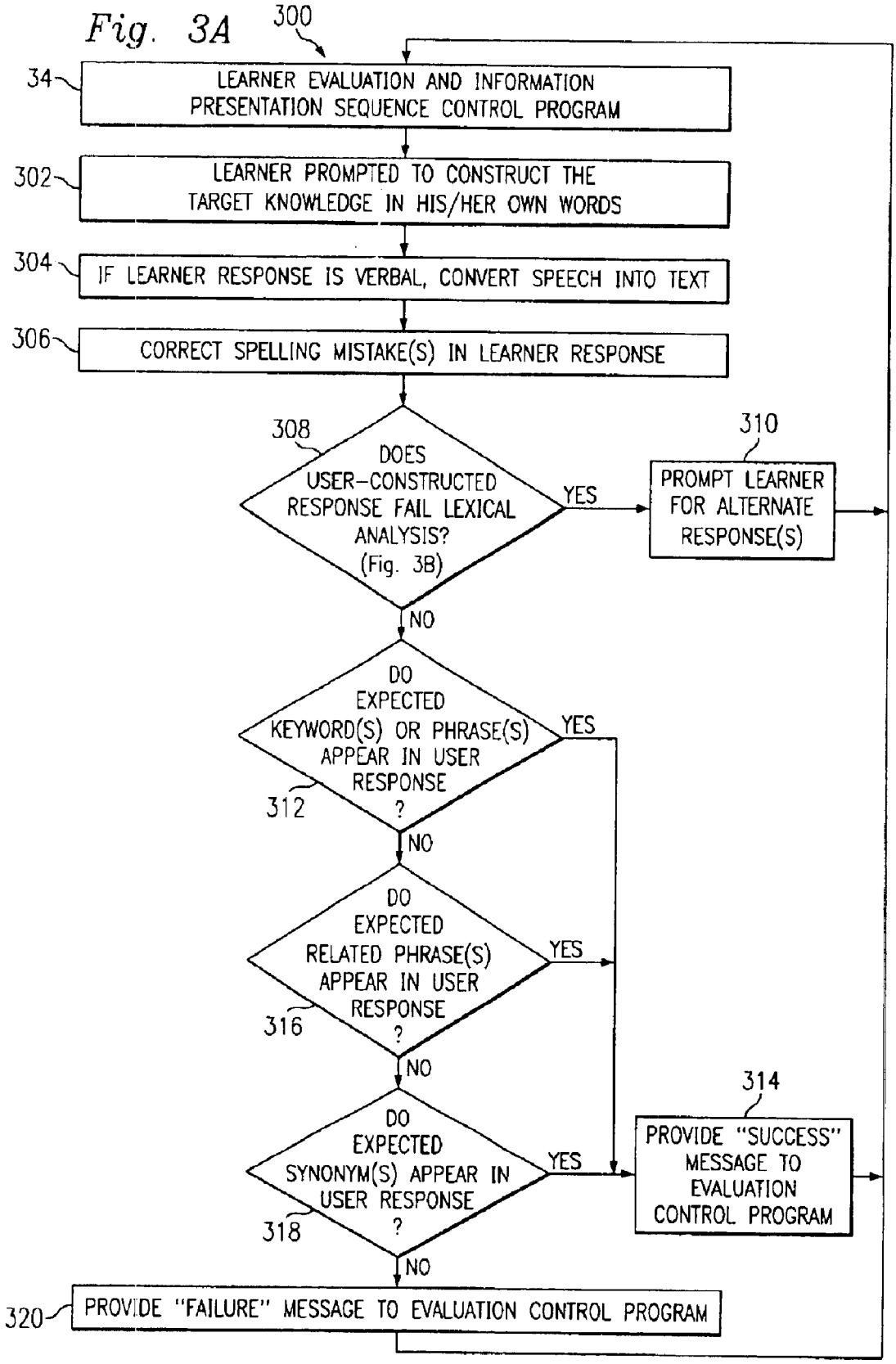
Fig. 3A
300
34
LEARNER EVALUATION AND INFORMATION PRESENTATION SEQUENCE CONTROL PROGRAM
302
LEARNER PROMPTED TO CONSTRUCT THE TARGET KNOWLEDGE IN HIS/HER OWN WORDS
304
IF LEARNER RESPONSE IS VERBAL, CONVERT SPEECH INTO TEXT
306
CORRECT SPELLING MISTAKE(S) IN LEARNER RESPONSE
308
DOES USER-CONSTRUCTED RESPONSE FAIL LEXICAL ANALYSIS? (Fig. 3B)
YES
310
PROMPT LEARNER FOR ALTERNATE RESPONSE(S)
NO
DO EXPECTED KEYWORD(S) OR PHRASE(S) APPEAR IN USER RESPONSE ?
312
YES
NO
DO EXPECTED RELATED PHRASE(S) APPEAR IN USER RESPONSE ?
316
YES
NO
DO EXPECTED SYNONYM(S) APPEAR IN USER RESPONSE ?
318
YES
314
PROVIDE "SUCCESS" MESSAGE TO EVALUATION CONTROL PROGRAM
NO
320
PROVIDE "FAILURE" MESSAGE TO EVALUATION CONTROL PROGRAM

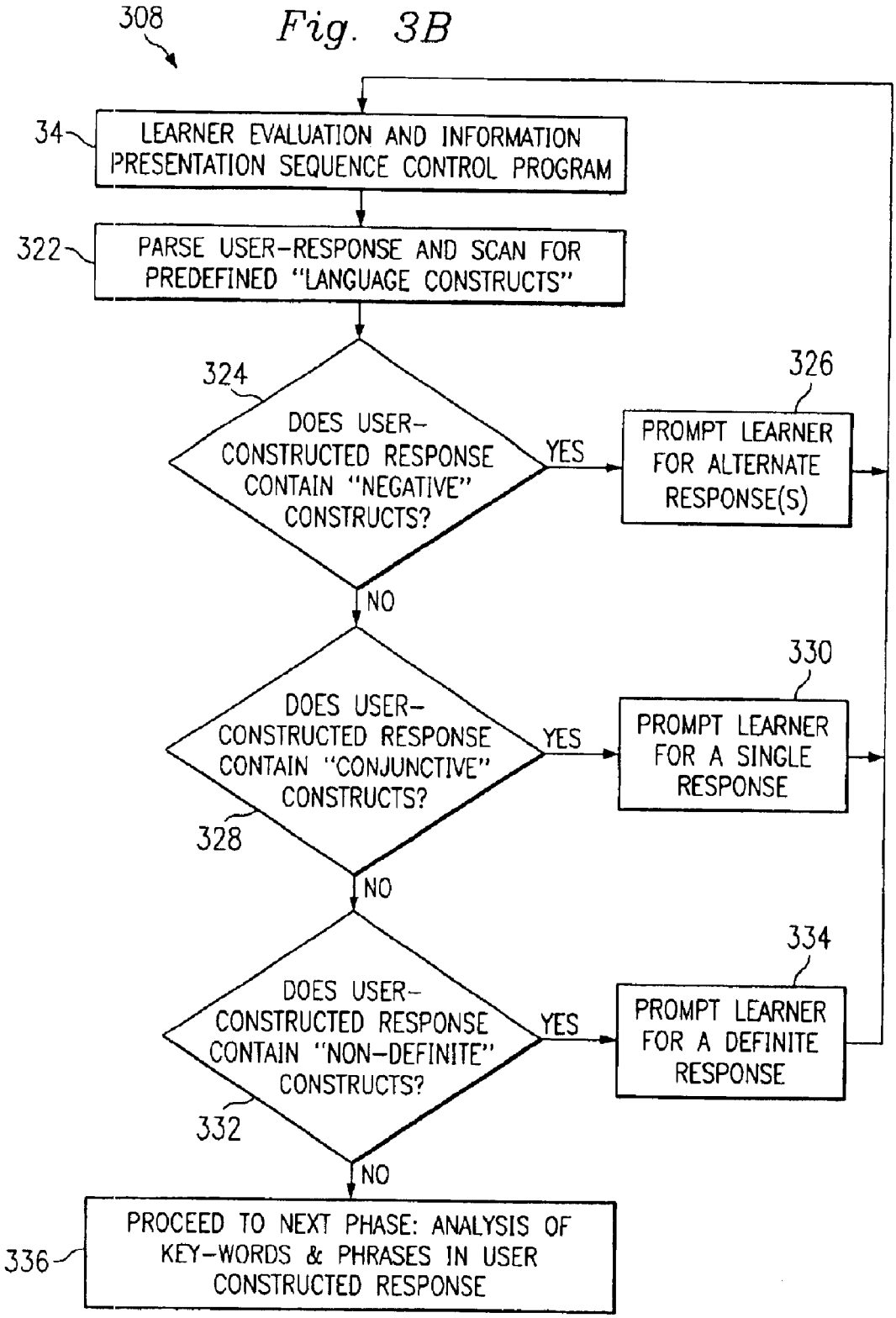
308
Fig. 3B
34
LEARNER EVALUATION AND INFORMATION PRESENTATION SEQUENCE CONTROL PROGRAM
322
PARSE USER-RESPONSE AND SCAN FOR PREDEFINED "LANGUAGE CONSTRUCTS"
324
DOES USER-CONSTRUCTED RESPONSE CONTAIN "NEGATIVE" CONSTRUCTS?
YES
326
PROMPT LEARNER FOR ALTERNATE RESPONSE(S)
NO
DOES USER-CONSTRUCTED RESPONSE CONTAIN "CONJUNCTIVE" CONSTRUCTS?
YES
330
PROMPT LEARNER FOR A SINGLE RESPONSE
328
NO
DOES USER-CONSTRUCTED RESPONSE CONTAIN "NON-DEFINITE" CONSTRUCTS?
YES
334
PROMPT LEARNER FOR A DEFINITE RESPONSE
332
NO
336
PROCEED TO NEXT PHASE: ANALYSIS OF KEY-WORDS & PHRASES IN USER CONSTRUCTED RESPONSE

LEARNING SYSTEM WITH LEARNER-CONSTRUCTED RESPONSE BASED METHODOLOGY

Matter enclosed in heavy brackets [ ] appears in the original patent but forms no part of this reissue specification; matter printed in italics indicates the additions made by reissue.

BACKGROUND

This invention relates to systems and methods for personnel training and, more particularly, to supervised or self-administered computer-based training systems that incorporate a learner-constructed response based testing methodology for improved evaluation of knowledge acquisition.

A variety of systems are available for automated learning and training using computers or other personal electronic devices. In current computer mediated learning and training systems, assessment of the "knowledge" gained by the user is carried out by, for example, true/false questions, matching (paired-associate) type questions, multiple choice questions, and marking questions. A multiple choice question differs from a marking question in that a multiple choice question has one correct answer, while a marking question has multiple correct answers. The foregoing question formats are not fully effective as learning aids, not are they reliable in assessing actual knowledge, for various reasons. For example, in a true/false question, a learner has a fifty-fifty chance of answering correctly by guessing; in a four way multiple choice question, the probability of a correct answer through guessing is twenty five percent. Test results thus are not necessarily indicative of actual knowledge.

What is needed, therefore, is a methodology for use in computer based training that provides for improved learning, improved efficiency, and improved reliability in the assessment of a user's actual knowledge of subject matter.

SUMMARY

This invention provides a methodology in which a learner-constructed response is provided in answer to a question presented by the system, the response being evaluated by comparison with pre-defined expected responses and, based upon the evaluation, the system determining whether to proceed to another question or to offer remedial feedback. Such a learner-constructed response based evaluation methodology greatly reduces the potential for "guesswork" based correct responses and improves the training process through remedial feedback and advancement upon demonstration of knowledge.

Evaluation of responses involves identification of predefined keyword data pertaining to the subject matter being tested. Examples include passages of text with important keywords (keywords being defined herein to include one or more words, or phases, or related words and phases, or synonyms). Multiple choice questions may also include keywords, such that after the learner completes a sequence of reading material or any kind of current multiple-choice, mix or match, true false questions, the learner is prompted to enter answers to "fill-in-the-blank" or "verbal narrative" questions (a learner-constructed response). The learner entered responses are compared to standard solutions recorded on the system and remedial actions are provided.

The methodology may be used in a specially designed training system or in cooperation with existing computer based training systems. For every "choice" based question (e.g., multiple choice), for example, the methodology may prompt for a "user-constructed response" based upon a question that has associated with it all acceptable correct user-constructed responses to this question, the presentation to the learner being designed to include an area or mechanism for capturing a learner response either in the form of text or spoken words. The correct response is recognized if the response matches the keyword(s), e.g., primary/related keyword(s) or phrase(s) and/or synonym(s).

In one implementation, a computer program is provided for implementing a learning system with a learner-constructed response based methodology, the program including a presentation process for presenting at least one knowledge topic to the learner and for prompting the learner to enter a learner constructed response thereto; an evaluation information process for providing keyword data that corresponds to the knowledge topic; and an evaluation process for determining, based upon entry of a learner-constructed response to the knowledge topic, success or failure of the learner to know the knowledge topic, the success or failure being determined by comparison of the learner-constructed response with the keyword data.

BRIEF DESCRIPTION OF THE DRAWINGS

FIGS. 3A and 3B are flow charts illustrating processes of the learning methodology.

DETAILED DESCRIPTION

Figure 1:
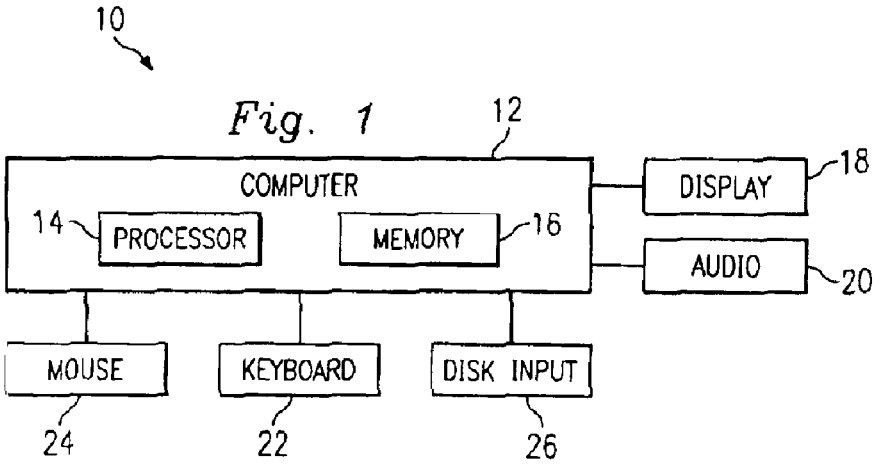
FIG. 1 is a schematic block diagram illustrating a system for implementing a learning methodology of the present invention.

In FIG. 1, the reference numeral 10 refers to a system for implementing a training methodology of the present invention, described in detail below. The system 10 includes a computer 12, having a processor 14 and a memory 16. It is understood that the computer 12 may comprise a personal or desktop computer, a television, a handheld device, or any other suitable electronic device. A display 18 and audio output 20 are connected to the computer. Inputs include a user keyboard 22, a mouse 24, or other suitable devices. The inputs are used for various purposes such as entering information initiated by the user, interacting with a software application running on the computer, etc. A disc input 26 is provided for providing programming or content for operation on the system 10, it being understood that any suitable media may be contemplated.

Programming, as discussed in detail below for implementing the present learning methodology, is stored on disc input 26 and/or memory 16 and is executed by the system 10. The learning methodology preferably is practiced using the foregoing system components, although it may be practiced with alternative components.

Figure 2A:
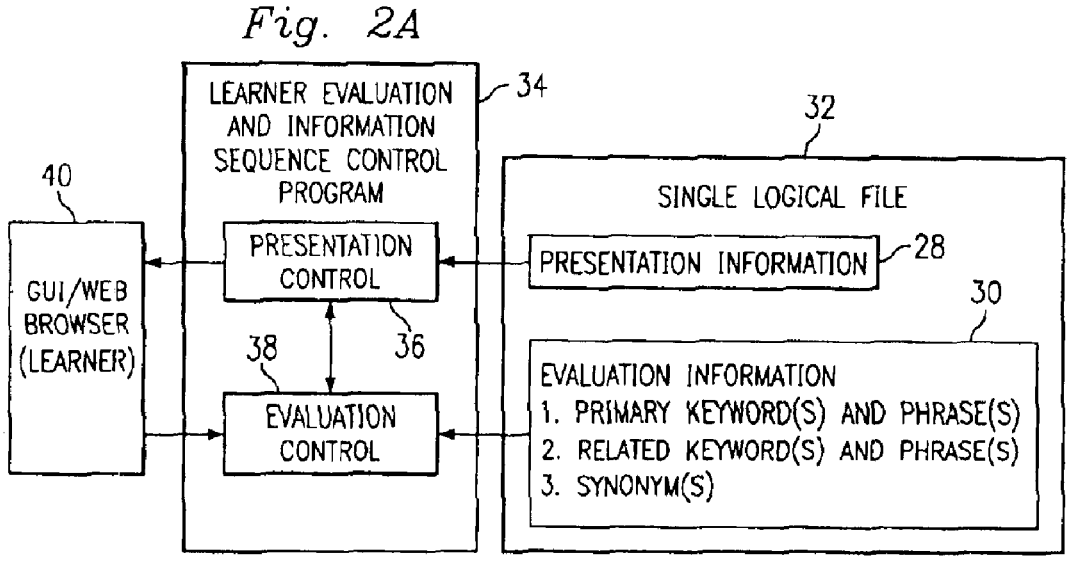
FIGS. 2A–2C are schematic representations illustrating components and question formats for the learning methodology.
Figure 2B:
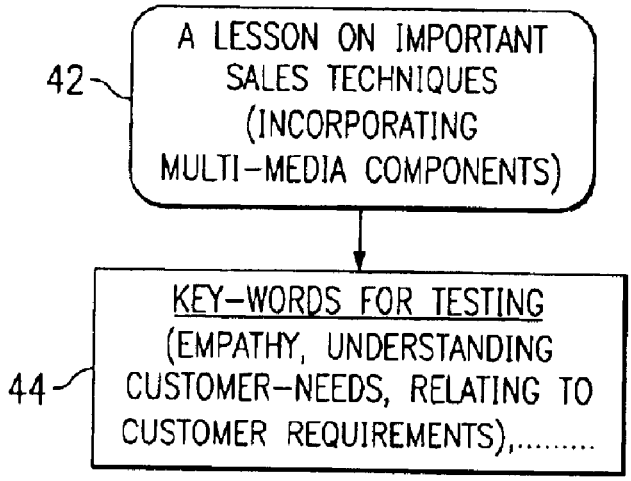
Figure 2C:
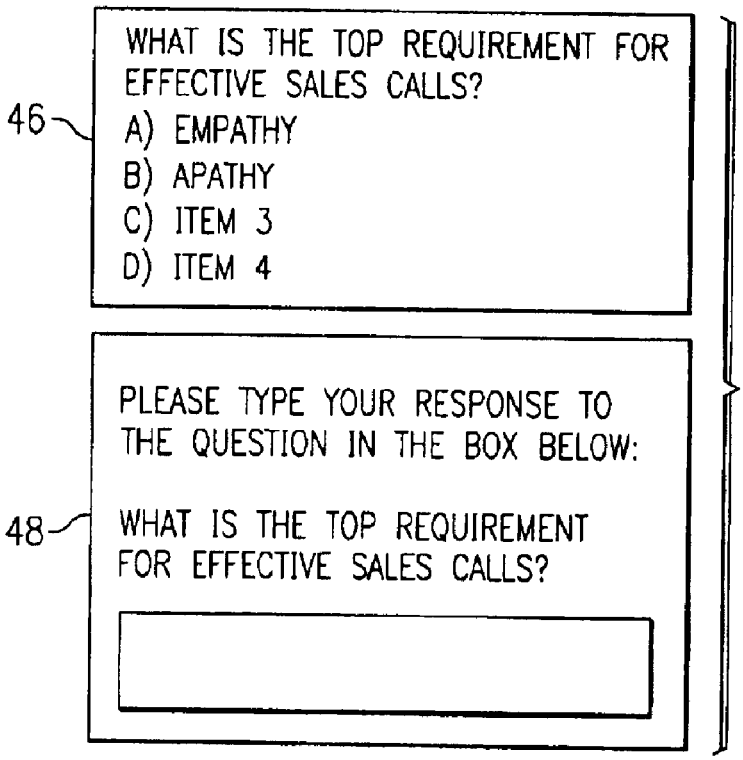

FIGS. 2A–2C illustrate schematically an example implementation of the learning methodology in which presentation information component 28 is associated with evaluation information component 30. A logical file 32 has encoded therein the components 28, 30 (it being understood that they may in some embodiments be encoded in distinct files). A learner evaluation and control program 34, including instructions for presentation control 36 and evaluation control 38, are provided to implement the methodology using the information contained in the file(s) 32. A graphical user interface ([GULI] *GUI*) 40 operates with the program 34 for providing the presentation and interaction with the learner, it being understood that the GUI 40 may be implemented using commercially available software including, but not limited to, a web browser. The file(s) 32, program 34, and GUI 40 are understood to operate in conjunction with standard software on the computer 12 of the system 10, and may be stored in memory 16, disk input 26, or as otherwise appropriate for efficient operation.

The presentation information component 28 contains information for presenting the question, and may also include additional instructions, help information and an avenue for capturing learner-constructed responses (e.g., a text area or a record button for voice input). The evaluation information component 30 may include a sequence of phrases and, in one embodiment, these may take the form of standard HTML tags for the display of question information and a sequence of proprietary tags for the encoding of expected key-words or phrases under the "META-DATA" tag in HTML.

Referring to FIGS. 2A and 2B, in one example the presentation information [information] 28 includes a target knowledge component 42 comprising subject matter content for presentation (e.g., display) to a learner. As illustrated, example content may comprise a lesson on important sales techniques, to be presented in any variety of ways to the learner (e.g., text, video, graphics, sound). The evaluation information component 30 includes keywords that may include one or more primary keywords and/or phrases, related keywords and/or phrases, and/or synonyms. The keywords may also be formatted to identify negative constructs (wrong answers) and flag them. In the example of FIG. 2B, the evaluation information component includes keyword component 44 as an associated set of words relevant to the target knowledge component 42. For example, keywords may describe one or more words or phrases that express the gist or main concepts of the topic under discussion, or the main concepts of a training session to be conveyed to the learners. Keywords may comprise one word, phrases, multiple associated words, synonyms and/or related phrases. For example, keywords may be organized as an n-tuple of consisting of one main word or phrase, followed by associated synonyms and related phrases. Keywords in the component 44 as illustrated in the example of FIG. 2B that correspond to the target knowledge component 42 are empathy, understanding customer needs, relating to customer requirements. It is understood that the authors of "content" for the system 10 will supply the target knowledge for the presentation information component 30, corresponding to each passage or item to be tested in the component 28. It is understood that the target knowledge of the component 28 may be expressed as text passages, graphics, video, or multiple choice questions, or in some other fashion.

The program 34 enables creation of the components 42, 44 for a desired training session. During the creation of the training "content" the authors are prompted to create different key-words and phrases that best describe the "gist" of the content or embody the essence of the knowledge topic under discussion. These key-words and phrases are utilized for the construction of questions. These key-words may also be analyzed to produce additional key-words, phrases or synonyms, and identify negative constructs (wrong answers).

Referring to FIG. 2C, illustrated are example question formats 46 and 48. Once the target knowledge component 42 is presented to the learner, a series of test questions may be provided to the learner. It is also understood that the target knowledge component 42 may itself take the form of multiple choice or other question or question/answer formats. As illustrated by the question format 48, eventually the learner will be presented with a question format that requires the learner to construct a response to a question about the target knowledge in which the learner must construct the target knowledge in his or her own words. The example illustrated is the format 48 in which the learner is prompted to fill in a blank in response to a displayed question. Other scenarios are similarly envisioned in which the learner must express an answer (audibly or in writing) in his or her own word or words. As described below, the learner's words are evaluated by the system 10 to determine whether remediation, further testing, or advancement to new material is appropriate.

FIG. 3A is a functional block diagram describing steps of an evaluation process 300 of the learning methodology as implemented by the program 34 operating on the computer 12 of the system 10, for example, FIG. 3B describes lexical pre-processing of a user-constructed response to eliminate negative, conjunctive, and non-definitive language constructs in the user-constructed response.

Referring to the process 300, in step 302 the learner is prompted to construct the target knowledge (presented previously, as described above) in his or her own words. One example of the prompt is the fill-in-the-blank format 48, above. In step 304, if the learner's response is verbal, the speech is converted into text data. After the learner's response has been fully entered, a comparison can be triggered automatically in a predetermined manner. For example, the learner can hit a particular key on the keyboard (e.g., an "Enter" key) or activate a particular area on the display screen to start the comparison. In step 306, the comparison is performed of the learner's response with the pre-defined key word data contained in the evaluation information component 30 (FIG. 2A). The comparison may involve a variety of analyses. For example, the comparison may:

(1) check for and correct spelling mistakes in the learner-constructed responses;

(2) determine whether the correct key word (words, phrases) appear in the learner-constructed response;

(3) determine whether synonyms of missing key word(s) appear in the learner-constructed response;

(4) determine whether related phrases that convey the same meaning as the expected key word(s) or phrases appear in the learner-constructed response;

(5) determine whether there are any incorrect key word(s) or phrases in the learner-constructed response or other negative constructs that might indicate a wrong answer.

A variety of logic selections for evaluation are contemplated. In one example, for purposes of improved learning and expediting the testing, a decision is made in step 308 of whether the learner response fails a lexical analysis (described more fully in FIG. 3B), thereby indicating a possible wrong answer or misunderstanding. If yes, then in step 310 the methodology prompts the user for a positive construct. If not, in step 312 a determination is made whether or not expected keyword(s) are found in the response, albeit not necessarily in the exact way or phraseology preferred. If yes, then the methodology proceeds to step 314 and provides a success message to the evaluation control program and execution returns to the program for testing of other target knowledge topics. If not, then in step 316 a determination is made whether expected related phrase(s) are found in the learner's response (thus indicating a correct or partially correct answer). If yes, execution proceeds to step 314. If not, in step 318 a determination is made whether expected synonym(s) appear in the learner response, thereby indicating a correct or partially correct answer. If yes, execution proceeds to step 314. If not, the methodology proceeds to step 320. In step 320, a "failure" message is sent to the evaluation control program 34.

Possible scenarios of a "failure" message to the evaluation control program 34 are that the evaluation control program may:

(1) Proceed to other questions and come back to the question upon which failure is indicated, until a satisfactory answer is received.

(2) Offer remedial questions or target information;

(3) Re-evaluate the learner with a focus on the missed part of the current topic.

Possible scenarios of a "success" message to the evaluation control program 34 are that the evaluation control program may:

(1) Discontinue further questioning on the target knowledge subject;

(2) Question the learner on the target knowledge again or in a different way to confirm understanding.

Referring to FIG. 3B, a lexical pre-processing algorithm 308 (described generally in FIG. 3A) is provided that eliminates negative, conjunctive, and non-definitive language constructs in user-constructed responses. In step 322, a user-constructed response is parsed and scanned for predefined language constructs.

In step 324, if the response contains negative constructs, the learner is prompted in step 326 for alternative responses. For example, if the learner types "no empathy" or "not empathy" or "don't XXX" or "can't YYY" a parsing algorithm that looks for "empathy" or "XXX" or "YYY" will normally flag this as correct even though the negative construct makes the meaning totally different. Accordingly, step 324 determines that the answer with the negative construct is incorrect and proceeds to step 326.

If in step 324 there are no negative constructs, in step 328 a determination is made whether the user-constructed response contains a "conjunctive" construct and, if so, in step 330 prompts the learner for a single response. As an example, if "and" or "hut" or "or" are included in the answer, to indicate a possible guess or two possible answers, step 328 determines that the user-constructed responses is not correct and prompts the learner in step 330.

If in step 328 there are no conjunctive constructs, a determination in step 332 whether there are non-definite constructs, and if so, prompts the learner for a definite response. Example non-definite constructs include, e.g., "maybe" or "perhaps."

If in step 332 there are no non-definite constructs, in step 336 execution proceeds to the next phase of the analysis, as further described in step 312 of FIG. 3A (described above).

It is noted that at any given moment during the execution of the above mentioned learning methodology, various information pertaining to the training session or the performance of the learner is collected by the system 10 for different purposes. In one specific case, at the end of a training session, the collected information gives an in-depth view of how well the learner has been trained. The collected information can be analyzed to generate various reports to be delivered to a predetermined interested party. For instance, the analyzed information will help to identify comparative difficulties of different materials or subjects covered in the training session, or provide information on how the learner has performed on a per question basis, etc. A statistical analysis and report can also be generated in a similar fashion based on the performances of a group of learners with regard to the training session. Therefore, the interested party can evaluate the performance of a group of learners to make various decisions such as to determine whether the training session should be revised, or whether the group of learners can be profiled in a certain manner.

In summary, the system 10 provides a learning methodology that improves the speed and retention of learning, and furthermore provides improved accuracy in assessment of the learner. By requiring, perhaps in addition to traditional multiple choice or other testing techniques, a learner-constructed response in which the learner must use his or her own words in answering a question, greater assurance is provided that the learner indeed knows the subject matter. Also, the system allows for refinement of the testing as the learner gets closer to accurate responses, as enabled by the construction of a key word component associated with the target knowledge component, as enabled by the evaluation process.

Although illustrative embodiments of the invention have been shown and described, other modifications, changes, and substitutions are intended in the foregoing disclosure. Accordingly, it is appropriate that the appended claims be constructed broadly and in a manner consistent with the scope of the invention.

What is claimed is:

1. A *computer readable storage medium storing a* computer program, *the computer program for execution by a computer system having a processor, a memory, and a display, the computer program* for implementing a learning system with a learner-constructed response based methodology, comprising:

a presentation process for presenting *on the display, using a graphical user interface,* at least one knowledge topic to the learner and for prompting the learner to enter a learner-constructed response thereto;

*a displaying process for presenting on the display, using the graphical user interface, the learner-constructed response;* an evaluation information process for providing keyword data that corresponds to the knowledge topic; and an evaluation process for determining, based upon entry of a learner-constructed response to the knowledge topic, success or failure of the learner to know the knowledge topic, the success or failure being determined by comparison of the learner-constructed response with the keyword data wherein upon a determination of failure of the learner, remedial information is provided to the learner before the learner is prompted to enter another learner-constructed response.

2. The program of claim 1 wherein the comparsion comprises a determination of whether or not expected keyword data appears in the learner-constructed response, the keyword data comprising at least one synonym.

3. A method for implementing an automated learning system, *the method performed by a computer system having a processor, a memory, and a display, the method* comprising:

presenting at least one knowledge topic *on the display, using a graphical user interface,* to the learner[and for]*;* prompting the learner to enter a [learner constructed] *learner-constructed* response thereto;

*presenting on the display, using the graphical user interface, the learner-constructed response;* comparing keyword data that corresponds to the knowledge topic with the learner-constructed response; and determining success of failure of the learner to know the knowledge topic, the success or failure being determined by whether or not expected keyword data appears in the learner-constructed response, wherein upon a determination of failure of the learner, remedial information is provided to the learner before the learner is prompted to enter another learner-constructed response.

4. A method for implementing an automated learning system, *the method performed by a computer system having a processor, a memory, and a display, the method* comprising:

presenting a series of knowledge topics *on the display, using a graphical user interface,* to the learner; [and]

prompting the learner to enter a [learner constructed] *learner-constructed* response to each topic;

*presenting on the display, using the graphical user interface, the learner-constructed responses;* comparing keyword data that corresponds to the knowledge topics with the learner-constructed responses; and determining success or failure of the learner to know each of the knowledge topic*s*, the success or failure being determined by whether or not expected keyword data appears in the learner-constructed response;

upon a determination of failure of the learner, providing remedial information to the learner and again prompting the learner to enter a learner-constructed response*;* upon a determination of success of the learner, discontinuing presentation and prompting of the learner regarding the particular knowledge topic;

whereupon automated presentation of the series is completed when success is determined for each knowledge topic.

5. The method of claim 4 wherein the comparing comprises a determination of whether or not expected keyword data appears in the learner-constructed response, the keyword data comprising at least one exact keyword.

6. The method of claim 4 wherein the comparing comprises a determination of whether or not expected keyword data appears in the learner-constructed response, the keyword data comprising at least one exact phrase.

7. The method of claim 4 wherein the comparing comprises a determination of whether or not expected keyword data appears in the learner-constructed response, the keyword data comprising at least one synonym.

8. The method of claim 4 wherein the comparing comprises a determination of whether or not the learner-constructed response fails a lexical analysis.

9. The method of claim 4 further comprising:

collecting information regarding a performance of at least one learner during the presentation process, the evaluation information process and the evaluation process;

analyzing the collected information; and generating a report based on the analyzed information for at least one predetermined party.

*10. The computer readable storage medium of claim 1, wherein the presentation process for prompting includes a process for prompting the learner to fill in a blank in response to a displayed question.*

*11. The computer readable storage medium of claim 1, wherein the presentation process for prompting includes a process for utilizing HTML tags to display a question.*

*12. The computer readable storage medium of claim 1, wherein the evaluation process for determining includes a process for comparing the learner-constructed response with data encoded in an HTML tag.*

*13. The computer readable storage medium of claim 1, wherein the evaluation process for determining includes a process for comparing the learner-constructed response with data encoded in a meta-data tag.*

*14. The computer readable storage medium of claim 1, wherein the presentation process for presenting includes a process for presenting text.*

*15. The computer readable storage medium of claim 1, wherein the presentation process for presenting includes a process for presenting graphics.*

*16. The computer readable storage medium of claim 1, wherein the presentation process for presenting includes a process for presenting video.*

*17. The computer readable storage medium of claim 1, wherein the presentation process for presenting includes a process for presenting on a desktop computer display.*

*18. The computer readable storage medium of claim 1, wherein the presentation process for presenting includes a process for presenting on a television display.*

*19. The computer readable storage medium of claim 1, wherein the presentation process for presenting includes a process for presenting on a hand-held display.*

*20. The computer readable storage medium of claim 1, wherein the presentation process for presenting includes a process for presenting, using a web browser, on the display.*

*21. The computer readable storage medium of claim 1, further comprising a receiving process for receiving the learner-constructed response via voice input.*

*22. The computer readable storage medium of claim 1, further comprising a receiving process for receiving the learner-constructed response via voice input and converting the voice input into text.*

*23. The method of claim 3, wherein the prompting includes prompting the learner to fill in a blank in response to a displayed question.*

*24. The method of claim 3, wherein the prompting includes utilizing HTML tags to display a question.*

*25. The method of claim 3, wherein the comparing includes comparing the learner-constructed response with data encoded in an HTML tag.*

*26. The method of claim 3, wherein the comparing includes comparing the learner-constructed response with data encoded in a meta-data tag.*

*27. The method of claim 3, wherein the presenting at least one knowledge topic includes presenting text.*

*28. The method of claim 3, wherein the presenting one knowledge topic includes presenting graphics.*

*29. The method of claim 3, wherein the presenting one knowledge topic includes presenting video.*

*30. The method of claim 3, wherein the presenting one knowledge topic includes presenting on a desktop computer display.*

*31. The method of claim 3, wherein the presenting one knowledge topic includes presenting on a television display.*

*32. The method of claim 3, wherein the presenting one knowledge topic includes presenting on a hand-held display.*

*33. The method of claim 3, wherein the presenting one knowledge topic includes presenting, using a web browser, on the display.*

*34. The method of claim 3, further comprising receiving the learner-constructed response via voice input.*

*35. The method of claim 3, further comprising receiving the learner-constructed response via voice input and converting the voice input into text.*

*36. The method of claim 4, wherein the prompting includes prompting the learner to fill in a blank in response to a displayed question.*

*37. The method of claim 4, wherein the prompting includes utilizing HTML tags to display a question.*

*38. The method of claim 4, wherein the comparing includes comparing at least one learner-constructed response with data encoded in an HTML tag.*

*39. The method of claim 4, wherein the comparing includes comparing at least one learner-constructed response with data encoded in a meta-data tag.*

*40. The method of claim 4, wherein the presenting a series of knowledge topics includes presenting text.*

*41. The method of claim 4, wherein the presenting a series of knowledge topics includes presenting graphics.*

*42. The method of claim 4, wherein the presenting a series of knowledge topics includes presenting video.*

*43. The method of claim 4, wherein the presenting a series of knowledge topics includes presenting on a desktop computer display.*

*44. The method of claim 4, wherein the presenting a series of knowledge topics includes presenting on a television display.*

*45. The method of claim 4, wherein the presenting a series of knowledge topics includes presenting on a hand-held display.*

*46. The method of claim 4, wherein the presenting a series of knowledge topics includes presenting, using a web browser, on the display.*

*47. The method of claim 4, further comprising receiving the learner-constructed response via voice input.*

*48. The method of claim 4, further comprising receiving the learner-constructed response via voice input and converting the voice input into text.*

*49. A computer readable storage medium storing a computer program, the computer program for execution by a computer system having a processor, a memory, and a display, the computer program for implementing a learning system with a learner-constructed response based methodology, comprising:*

*a presentation process for presenting on the display, using a graphical user interface, at least one knowledge topic to the learner and for prompting the learner to enter a learner-constructed response thereto;*

*a displaying process for presenting on the display, using the graphical user interface, the learner-constructed response;*

*an evaluation information process for providing keyword data that corresponds to the knowledge topic; and*

*an evaluation process for determining, based upon entry of the learner-constructed response to the knowledge topic, success or failure of the learner to know the knowledge topic, the success or failure being determined by comparison of the learner-constructed response with the keyword data wherein after a determination of failure of the learner, remedial information is provided to the learner, after which the learner is prompted to enter another learner-constructed response.*

*50. The computer readable storage medium of claim 49, wherein the presentation process for prompting includes a process for prompting the learner to fill in a blank in response to a displayed question.*

*51. The computer readable storage medium of claim 49, wherein the presentation process for prompting includes a process for utilizing HTML tags to display a question.*

*52. The computer readable storage medium of claim 49, wherein the evaluation process for determining includes a process for comparing the learner-constructed response with data encoded in an HTML tag.*

*53. The computer readable storage medium of claim 49, wherein the evaluation process for determining includes a process for comparing the learner-constructed response with data encoded in a meta-data tag.*

*54. The computer readable storage medium of claim 49, wherein the presentation process for presenting includes a process for presenting text.*

*55. The computer readable storage medium of claim 49, wherein the presentation process for presenting includes a process for presenting graphics.*

*56. The computer readable storage medium of claim 49, wherein the presentation process for presenting includes a process for presenting video.*

*57. The computer readable storage medium of claim 49, wherein the presentation process for presenting includes a process for presenting on a desktop computer display.*

*58. The computer readable storage medium of claim 49, wherein the presentation process for presenting includes a process for presenting on a television display.*

*59. The computer readable storage medium of claim 49, wherein the presentation process for presenting includes a process for presenting on a hand-held display.*

*60. The computer readable storage medium of claim 49, wherein the presentation process for presenting includes a process for presenting, using a web browser, on the display.*

*61. The computer readable storage medium of claim 49, further comprising a receiving process for receiving the learner-constructed response via voice input.*

*62. The computer readable storage medium of claim 49, further comprising a receiving process for receiving the learner-constructed response via voice input and converting the voice input into text.*

*63. A computer readable storage medium storing a computer program, the computer program for execution by a computer system having a processor, a memory, and a display, the computer program for implementing a learning system with a learner-constructed response based methodology, comprising:*

*a presentation process for presenting on the display, using a graphical user interface, at least one knowledge topic to the learner and for prompting the learner to enter a learner-constructed response to one of the at least one knowledge topic;*

*a displaying process for presenting on the display, using the graphical user interface, the learner-constructed response;*

*an evaluation information process for providing keyword data that corresponds to the one of the at least one knowledge topic; and*

*an evaluation process for determining, based upon entry of the learner-constructed response to the knowledge topic, success or failure of the learner to know the knowledge topic, the success or failure being determined by comparison of the learner-constructed response with the keyword data, wherein upon a determination of failure of the learner, remedial information is provided to the learner after the learner is prompted to enter the learner-constructed response.*

*64. The computer readable storage medium of claim 63, wherein the presentation process for prompting includes a process for prompting the learner to fill in a blank in response to a displayed question.*

*65. The computer readable storage medium of claim 63, wherein the presentation process for prompting includes a process for utilizing HTML tags to display a question.*

*66. The computer readable storage medium of claim 63, wherein the evaluation process for determining includes a process for comparing the learner-constructed response with data encoded in an HTML tag.*

*67. The computer readable storage medium of claim 63, wherein the evaluation process for determining includes a process for comparing the learner-constructed response with data encoded in a meta-data tag.*

*68. The computer readable storage medium of claim 63, wherein the presentation process for presenting includes a process for presenting text.*

*69. The computer readable storage medium of claim 63, wherein the presentation process for presenting includes a process for presenting graphics.*

*70. The computer readable storage medium of claim 63, wherein the presentation process for presenting includes a process for presenting video.*

*71. The computer readable storage medium of claim 63, wherein the presentation process for presenting includes a process for presenting on a desktop computer display.*

*72. The computer readable storage medium of claim 63, wherein the presentation process for presenting includes a process for presenting on a television display.*

*73. The computer readable storage medium of claim 63, wherein the presentation process for presenting includes a process for presenting on a hand-held display.*

*74. The computer readable storage medium of claim 63, wherein the presentation process for presenting includes a process for presenting, using a web browser, on the display.*

*75. The computer readable storage medium of claim 63, further comprising a receiving process for receiving the learner-constructed response via voice input.*

*76. The computer readable storage medium of claim 63, further comprising a receiving process for receiving the learner-constructed response via voice input and converting the voice input into text.*

*77. A computer readable storage medium storing a computer program, the computer program for execution by a computer system having a processor, a memory, and a display, the computer program for implementing a learning system with a learner-constructed response based methodology, comprising:*

*a presentation process for presenting on the display, using a graphical user interface, at least one knowledge topic to the learner and for prompting the learner to enter a learner-constructed response thereto;*

*a displaying process for presenting on the display, using the graphical user interface, the learner-constructed response;*

*an evaluation information process for providing keyword data that corresponds to the knowledge topic; and*

*an evaluation process for determining, based upon entry of a learner-constructed response to the knowledge topic, success or failure of the learner to know the knowledge topic, the success or failure being determined by comparison of the learner-constructed response with the keyboard data, wherein upon a determination of failure of the learner, remedial information is provided to the learner before the learner is prompted to enter a last learner-constructed response.*

*78. The computer readable storage medium of claim 77, wherein the presentation process for prompting includes a process for prompting the learner to fill in a blank in response to a displayed question.*

*79. The computer readable storage medium of claim 77, wherein the presentation process for prompting includes a process for utilizing HTML tags to display a question.*

*80. The computer readable storage medium of claim 77, wherein the evaluation process for determining includes a process for comparing the learner-constructed response with data encoded in an HTML tag.*

*81. The computer readable storage medium of claim 77, wherein the evaluation process for determining includes a process for comparing the learner-constructed response with data encoded in a meta-data tag.*

*82. The computer readable storage medium of claim 77, wherein the presentation process for presenting includes a process for presenting text.*

*83. The computer readable storage medium of claim 77, wherein the presentation process for presenting includes a process for presenting graphics.*

*84. The computer readable storage medium of claim 77, wherein the presentation process for presenting includes a process for presenting video.*

*85. The computer readable storage medium of claim 77, wherein the presentation process for presenting includes a process for presenting on a desktop computer display.*

*86. The computer readable storage medium of claim 77, wherein the presentation process for presenting includes a process for presenting on a television display.*

*87. The computer readable storage medium of claim 77, wherein the presentation process for presenting includes a process for presenting on a hand-held display.*

*88. The computer readable storage medium of claim 77, wherein the presentation process for presenting includes a process for presenting, using a web browser, on the display.*

*89. The computer readable storage medium of claim 77, further comprising a receiving process for receiving the learner-constructed response via voice input.*

*90. The computer readable storage medium of claim 77, further comprising a receiving process for receiving the learner-constructed response via voice input and converting the voice input into text.*

*91. A computer readable storage medium storing a computer program, the computer program for execution by a computer system having a processor, a memory, and a display, the computer program for implementing a learning system with a learner-constructed response based methodology, comprising:*

*a presentation process for presenting on the display, using a graphical user interface, at least one knowledge topic to the learner and for prompting the learner to enter a learner-constructed response thereto;*

*a displaying process for presenting on the display, using the graphical user interface, the learner-constructed response;*

*an evaluation information process for providing keyword data that corresponds to the knowledge topic; and*

*an evaluation process for determining, based upon entry of a learner-constructed response to the knowledge topic, success or failure of the learner to know the knowledge topic, the success or failure being determined by comparison of the learner-constructed response with the keyword data wherein upon a determination of failure of the learner, remedial information is provided to the learner before the learner is prompted to enter a plurality of learner-constructed responses.*

*92. The computer readable storage medium of claim 91, wherein the presentation process for prompting includes a process for prompting the learner to fill in a blank in response to a displayed question.*

*93. The computer readable storage medium of claim 91, wherein the presentation process for prompting includes a process for utilizing HTML tags to display a question.*

*94. The computer readable storage medium of claim 91, wherein the evaluation process for determining includes a process for comparing the learner-constructed response with data encoded in an HTML tag.*

*95. The computer readable storage medium of claim 91, wherein the evaluation process for determining includes a process for comparing the learner-constructed response with data encoded in a meta-data tag.*

*96. The computer readable storage medium of claim 91, wherein the presentation process for presenting includes a process for presenting text.*

*97. The computer readable storage medium of claim 91, wherein the presentation process for presenting includes a process for presenting graphics.*

*98. The computer readable storage medium of claim 91, wherein the presentation process for presenting includes a process for presenting video.*

*99. The computer readable storage medium of claim 91, wherein the presentation process for presenting includes a process for presenting on a desktop computer display.*

*100. The computer readable storage medium of claim 91, wherein the presentation process for presenting includes a process for presenting on a television display.*

*101. The computer readable storage medium of claim 91, wherein the presentation process for presenting includes a process for presenting on a hand-held display.*

*102. The computer readable storage medium of claim 91, wherein the presentation process for presenting includes a process for presenting, using a web browser, on the display.*

*103. The computer readable storage medium of claim 91, further comprising a receiving process for receiving the learner-constructed response via voice input.*

*104. The computer readable storage medium of claim 91, further comprising a receiving process for receiving the learner-constructed response via voice input and converting the voice input into text.*

*105. A method for implementing an automated learning system, the method performed by a computer system having a processor, a memory, and a display, the method comprising:*

*presenting on the display, using a graphical user interface, at least one knowledge topic to the learner;*

*prompting the learner to enter a learner-constructed response to one of the at least one knowledge topic;*

*presenting the learner-constructed response on the display using the graphical user interface;*

*comparing keyword data that corresponds to the one knowledge topic with the learner-constructed response; and*

*determining success or failure of the learner to know the knowledge topic, the success or failure being determined by whether or not expected keyword data appears in the learner-constructed response, wherein upon a determination of failure of the learner, remedial information is provided to the learner before the learner is prompted to enter a last learner-constructed response.*

*106. The method of claim 105, wherein the prompting includes prompting the learner to fill in a blank in response to a displayed question.*

*107. The method of claim 105, wherein the prompting includes utilizing HTML tags to display a question.*

*108. The method of claim 105, wherein the determining includes comparing the learner-constructed response with data encoded in an HTML tag.*

*109. The method of claim 105, wherein the determining includes comparing the learner-constructed response with data encoded in a meta-data tag.*

*110. The method of claim 105, wherein the presenting the at least one knowledge topic includes presenting text.*

*111. The method of claim 105, wherein the presenting the at least one knowledge topic includes presenting graphics.*

*112. The method of claim 105, wherein the presenting the at least one knowledge topic includes presenting video.*

*113. The method of claim 105, wherein the presenting the at least one knowledge topic includes presenting on a desktop computer display.*

*114. The method of claim 105, wherein the presenting the at least one knowledge topic includes presenting on a desktop computer display.*

*115. The method of claim 105, wherein the presenting the at least one knowledge topic includes presenting on a hand-held display.*

*116. The method of claim 105, wherein the presenting the at least one knowledge topic includes presenting, using a web browser, on the display.*

*117. The method of claim 105, further comprising receiving the learner-constructed response via voice input.*

*118. The method of claim 105, further comprising receiving the learner-constructed response via voice input and converting the voice input into text.*

*119. A method for implementing an automated learning system, the method performed by a computer system having a processor, a memory, and a display, the method comprising:*

*presenting on the display, using a graphical user interface, at least one knowledge topic to the learner;*

*prompting the learner to enter a learner-constructed response thereto;*

*presenting the learner-constructed response on the display using the graphical user interface;*

*comparing keyword data that corresponds to the knowledge topic with the learner-constructed response; and*

*determining success or failure of the learner to know the knowledge topic, the success or failure being determined by whether or not expected keyword data appears in the learner-constructed response, wherein upon a determination of failure of the learner, remedial information is provided to the learner before the learner is prompted to enter a last learner-constructed response.*

*120. The method of claim 119, wherein the prompting includes prompting the learner to fill in a blank in response to a displayed question.*

*121. The method of claim 119, wherein the prompting includes utilizing HTML tags to display a question.*

*122. The method of claim 119, wherein the determining includes comparing the learner-constructed response with data encoded in an HTML tag.*

*123. The method of claim 119, wherein the determining includes comparing the learner-constructed response with data encoded in a meta-data tag.*

*124. The method of claim 119, wherein the presenting the at least one knowledge topic includes presenting text.*

*125. The method of claim 119, wherein the presenting the at least one knowledge topic includes presenting graphics.*

*126. The method of claim 119, wherein the presenting the at least one knowledge topic includes presenting video.*

*127. The method of claim 119, wherein the presenting the at least one knowledge topic includes presenting on a desktop computer display.*

*128. The method of claim 119, wherein the presenting the at least one knowledge topic includes presenting on a television display.*

*129. The method of claim 119, wherein the presenting the at least one knowledge topic includes presenting on a hand-held display.*

*130. The method of claim 119, wherein the presenting the at least one knowledge topic includes presenting, using a web browser, on the display.*

*131. The method of claim 119, further comprising receiving the learner-constructed response via voice input.*

*132. The method of claim 119, further comprising receiving the learner-constructed response via voice input and converting the voice input into text.*

*133. A method for implementing an automated learning system, the method performed by a computer system having a processor, a memory, and a display, the method comprising:*

*presenting on the display, using a graphical user interface, at least one knowledge topic to the learner;*

*prompting the learner to enter a learner-constructed response to the at least one knowledge topic;*

*presenting the learner-constructed response on the display using the graphical user interface;*

*comparing keyword data that corresponds to the knowledge topic with the learner-constructed response; and*

*determining success or failure of the learner to know the knowledge topic, the success or failure being determined by whether or not expected keyword data appears in the learner-constructed response, wherein upon a determination of failure of the learner, remedial information is provided to the learner after the learner is prompted to enter the learner-constructed response.*

*134. The method of claim 133, wherein the prompting includes prompting the learner to fill in a blank in response to a displayed question.*

*135. The method of claim 133, wherein the prompting includes utilizing HTML tags to display a question.*

*136. The method of claim 133, wherein the determining includes comparing the learner-constructed response with data encoded in an HTML tag.*

*137. The method of claim 133, wherein the determining includes comparing the learner-constructed response with data encoded in a meta-data tag.*

*138. The method of claim 133, wherein the presenting the at least one knowledge topic includes presenting text.*

*139. The method of claim 133, wherein the presenting the at least one knowledge topic includes presenting graphics.*

*140. The method of claim 133, wherein the presenting the at least one knowledge topic includes presenting video.*

*141. The method of claim 133, wherein the presenting the at least one knowledge topic includes presenting on a desktop computer display.*

*142. The method of claim 133, wherein the presenting the at least one knowledge topic includes presenting on a television display.*

*143. The method of claim 133, wherein the presenting the at least one knowledge topic includes presenting on a hand-held display.*

*144. The method of claim 133, wherein the presenting the at least one knowledge topic includes presenting, using a web browser, on the display.*

*145. The method of claim 133, further comprising receiving the learner-constructed response via voice input.*

*146. The method of claim 133, further comprising receiving the learner-constructed response via voice input and converting the voice input into text.*

*147. A method for implementing an automated learning system, the method performed by a computer system having a processor, a memory, and a display, the method comprising:*

*presenting on the display, using a graphical user interface, a series of knowledge topics to the learner;*

*prompting the learner to enter a learning constructed response to each knowledge topic;*

*presenting the learner-constructed response on the display using the graphical user interface;*

*comparing keyword data that corresponds to each knowledge topic with each learner-constructed response;*

*determining a success or a failure of the learner to know each knowledge topic, the success or failure being determined by whether expected keyword data appears in each learner-constructed response;*

*after a determination of failure of the learner for a particular knowledge topic, providing remedial information to the learner for the particular knowledge topic and prompting the learner to enter a new learner-constructed response to the particular knowledge topic;*

*upon a determination of success of the learner for a particular one of the knowledge topics, discontinuing presentation and prompting of the learner regarding the particular one of the knowledge topics.*

*148. The method of claim 147, wherein the prompting includes prompting the learner to fill in a blank in response to a displayed question.*

*149. The method of claim 147, wherein the prompting includes utilizing HTML tags to display a question.*

*150. The method of claim 147, wherein the determining includes comparing at least one learner-constructed response with data encoded in an HTML tag.*

*151. The method of claim 147, wherein the determining includes comparing at least one learner-constructed response with data encoded in a meta-data tag.*

*152. The method of claim 147, wherein the presenting the series of knowledge topics includes presenting text.*

*153. The method of claim 147, wherein the presenting the series of knowledge topics includes presenting graphics.*

*154. The method of claim 147, wherein the presenting the series of knowledge topics includes presenting video.*

*155. The method of claim 147, wherein the presenting the series of knowledge topics includes presenting on a desktop computer display.*

*156. The method of claim 147, wherein the presenting the series of knowledge topics includes presenting on a television display.*

*157. The method of claim 147, wherein the presenting the series of knowledge topics includes presenting on a hand-held display.*

*158. The method of claim 147, wherein the presenting the series of knowledge topics includes presenting, using a web browser, on the display.*

*159. The method of claim 147, further comprising receiving the learner-constructed response via voice input.*

*160. The method of claim 147, further comprising receiving the learner-constructed response via voice input and converting the voice input into text.*

*161. A method for implementing an automated learning system, the method performed by a computer system having a processor, a memory, and a display, the method comprising:*

*presenting on the display, using a graphical user interface, a series of knowledge topics to the learner;*

*prompting the learner to enter a learner-constructed response to each topic;*

*presenting the learner-constructed response on the display using the graphical user interface;*

*comparing keyword data that corresponds to the knowledge topics with the learner-constructed responses;*

*determining success or failure of the learner knowing each one of the knowledge topics, the success or failure being determined by whether or not expected keyword data appears in each learner-constructed response; and*

*upon a determination of failure of the learner, providing remedial information to the learner at a later time and prompting the learner to enter another learner-constructed response.*

*162. The method of claim 161, wherein the prompting includes prompting the learner to fill in a blank in response to a displayed question.*

*163. The method of claim 161, wherein the prompting includes utilizing HTML tags to display a question.*

*164. The method of claim 161, wherein the determining includes comparing at least one learner-constructed response with data encoded in an HTML tag.*

*165. The method of claim 161, wherein the determining includes comparing at least one learner-constructed response with data encoded in a meta-data tag.*

*166. The method of claim 161, wherein the presenting the series of knowledge topics includes presenting text.*

*167. The method of claim 161, wherein the presenting the series of knowledge topics includes presenting graphics.*

*168. The method of claim 161, wherein the presenting the series of knowledge topics includes presenting video.*

*169. The method of claim 161, wherein the presenting the series of knowledge topics includes presenting on a desktop computer display.*

*170. The method of claim 161, wherein the presenting the series of knowledge topics includes presenting on a television display.*

*171. The method of claim 161, wherein the presenting the series of knowledge topics includes presenting on a hand-held display.*

*172. The method of claim 161, wherein the presenting the series of knowledge topics includes presenting, using a web browser, on the display.*

*173. The method of claim 161, further comprising receiving the learner-constructed response via voice input.*

*174. The method of claim 161, further comprising receiving the learner-constructed response via voice input and converting the voice input into text.*

* * * * *

UNITED STATES PATENT AND TRADEMARK OFFICE

CERTIFICATE OF CORRECTION

PATENT NO. : RE 39,435 E
APPLICATION NO. : 10/653748
DATED : December 19, 2006
INVENTOR(S) : Dennis Ray Berman It is certified that error appears in the above-identified patent and that said Letters Patent is hereby corrected as shown below:

In Claim 1 (at column 6, lines 53-54):
Delete “before the learner is prompted to enter another learner-constructed response”.

In Claim 3 (at column 7, line 5):
Replace “success of failure” with --success or failure--.

In Claim 3 (at column 7, lines 10-12):
Delete “before the learner is prompted to enter another learner-constructed response”.

In Claim 11 (at column 7, line 67):
Replace “HTML” with --Hypertext Markup Language (HTML)--.

In Claim 24 (at column 8, line 40):
Replace “HTML” with --Hypertext Markup Language (HTML)--.

In Claim 37 (at column 9, line 5):
Replace “HTML” with --Hypertext Markup Language (HTML)--.

In Claim 51 (at column 9, line 65):
Replace “HTML” with --Hypertext Markup Language (HTML)--.

In Claim 65 (at column 10, line 67):
Replace “HTML” with --Hypertext Markup Language (HTML)--.

In Claim 79 (at column 11, line 67):
Replace “HTML” with --Hypertext Markup Language (HTML)--.

In Claim 93 (at column 12, line 67):
Replace “HTML” with --Hypertext Markup Language (HTML)--.

In Claim 107 (at column 13, line 61):
Replace “HTML” with --Hypertext Markup Language (HTML)--.

In Claim 121 (at column 14, line 49):
Replace “HTML” with --Hypertext Markup Language (HTML)--.

In Claim 135 (at column 15, line 34):
Replace “HTML” with --Hypertext Markup Language (HTML)--.

UNITED STATES PATENT AND TRADEMARK OFFICE

CERTIFICATE OF CORRECTION

PATENT NO. : RE 39,435 E
APPLICATION NO. : 10/653748
DATED : December 19, 2006
INVENTOR(S) : Dennis Ray Berman It is certified that error appears in the above-identified patent and that said Letters Patent is hereby corrected as shown below:

In Claim 149 (at column 16, line 28):
Replace "HTML" with --Hypertext Markup Language (HTML)--.

In Claim 163 (at column 17, line 16):
Replace "HTML" with --Hypertext Markup Language (HTML)--.

Signed and Sealed this

Twentieth Day of March, 2007

JON W. DUDAS
*Director of the United States Patent and Trademark Office*